United States Patent [19]

DeAngelis et al.

[11] Patent Number: 4,888,317

[45] Date of Patent: Dec. 19, 1989

[54] CATALYST-AGGLOMERATE BODIES ENCAPSULATED IN A STRUCTURE AND METHOD FOR THEIR PRODUCTION

[75] Inventors: Thomas P. DeAngelis, Big Flats; Irwin M. Lachman, Corning; Raja R. Wusirika, Painted Post, all of N.Y.

[73] Assignee: Corning Incorporated, Corning, N.Y.

[21] Appl. No.: 219,984

[22] Filed: Jul. 15, 1988

[51] Int. Cl.$^4$ .......................... B01J 32/00; B01J 35/04
[52] U.S. Cl. ........................................ 502/60; 502/300; 502/305; 502/319; 502/321; 502/324; 502/325; 502/337; 502/338; 502/339; 502/343; 502/344; 502/345; 502/347; 502/349; 502/350; 502/353; 502/439; 502/527
[58] Field of Search ................. 502/439, 527, 60, 300, 502/305, 319, 321, 324, 325, 337, 338, 339, 343, 344, 345, 347, 349, 350, 353, 355

[56] References Cited

U.S. PATENT DOCUMENTS

| 4,305,845 | 12/1981 | Tu | 502/64 |
| 4,521,532 | 6/1985 | Cho | 502/439 |
| 4,637,995 | 1/1987 | DeAngelis et al. | 502/527 X |

FOREIGN PATENT DOCUMENTS

| 60-197242 | 10/1985 | Japan | 502/527 |
| 61-287452 | 12/1986 | Japan | 502/527 |
| 81100970 | 4/1981 | World Int. Prop. O. | 502/527 |

Primary Examiner—W. J. Shine
Attorney, Agent, or Firm—Charles Q. Buckwalter, Jr.; Richard N. Wardell

[57] ABSTRACT

A structure with encapsulated catalyst-agglomerate bodies which are integral to a porous structure is presented. The catalysts may be singly and/or multiply dispersed on and/or throughout a high surface area material and subsequently mixed with batch material prior to firing the structure. This results in a structure wherein encapsulated catalyst-agglomerate bodies in a porous structure exhibit the same catalytic activity as in a break in aged catalyst coated substrate.

24 Claims, No Drawings

4,888,317

CATALYST-AGGLOMERATE BODIES ENCAPSULATED IN A STRUCTURE AND METHOD FOR THEIR PRODUCTION

RELATED APPLICATION

U.S. application Ser. No. 07/219,985, filed concurrently herewith by I. M. Lachman, M. D. Patil, J. L. Williams, R. R. Wusirika under the title CATALYTICALLY ACTIVE MATERIALS, discloses the production of metallic catalysts integral with a structural support material which upon sintering results in a hard porous catalytically active body.

BACKGROUND OF THE INVENTION

The present invention is directed to a catalytic structure that includes an active catalyst which is integral to the structure. The batch material of the structure is mixed with a catalyst, which is combined with a high surface area agglomerated body, added to the batch in a manner to preserve its chemical independence from the batch. The mixture is then extruded and fired or sintered to produce a structure with the catalyst integral to that structure.

Typically, a structure such as a ceramic honeycomb is batched, extruded, fired, coated with a catalyst/washcoat slurry, and then sintered to produce a catalytically active substrate. The product of such a procedure suffers from several disadvantages when put into use. Since the catalyst is integral only to the washcoat the residence time of the catalyst is dependent upon the integrity of the washcoat substrate bonding interface. When this product is subjected to the normal stresses of use the coating flakes off due to thermal expansion stresses, mechanical stresses due to effluent collisions, and vibrational shock.

An additional disadvantage relates to the production process itself. A coating operation is a multi-step process in which a substrate is produced, then coated, and finally sintered to the final product. Prior to being put into service the fragile coating is subject to mechanical stresses in the inevitable shipping and handling which must occur prior to the products final destination.

Prior attempts at resolving the problems inherent to the catalytically coated substrate have been directed at introducing powdered catalysts into the batch material, such as U.S. Pat. No. 4,295,818 (the '818 patent). The '818 patent mixes the catalyst with the batch material so that the catalyst is homogeneously interspersed throughout the structure.

The disadvantage with such a catalyst distribution is that necessarily, some of the active catalyst will be buried by the structure itself resulting in inaccessibility of certain portions of the active catalyst. Additionally, the catalyst may become bound to the matrix components of the structure. Unless the catalyst in some manner is able to accommodate the structural component, it may weaken the structure to subsequent degradation. This requirement of active catalyst and structural accommodation restricts the class of catalyst available to that particular catalyst-carrier system.

Other methods of integrating the catalyst into the structure of the catalyst carrier include impregnation, as in U.S. Pat. No. 4,522,940 and cosputtering as disclosed in U.S. Pat. No. 4,536,482. Both of these techniques are interposed after the substrate has been fired, therefore the high temperature reaction has occurred, leaving available bonding forces for the catalyst-carrier system that are orders of magnitude less than those if the catalyst is fired with the carrier.

Attempts have been made to integrate the washcoat material into the substrate as in U.S. Pat. No. 4,657,880 (the '880 patent). In the '880 patent the washcoat was integrated into the structure to provide a greater surface area for later incorporation of the catalyst material. This technique provided additional surface area for catalyst deposition, however, the catalyst was still not integral to the substrate structure.

The object of the present invention is to provide an active catalyst which is integral to the structure, avoid the disadvantages of the prior efforts exposed above, and to provide a simpler method by which to incorporate the catalyst into the structure of the catalyst carrier. A structure constructed as in the present invention may be advantageously placed in the exhaust path in an organically fueled power plant for catalysis of the noxious by-products of fuel combustion. The structure may also be usefully employed in the catalysis reactions required in the exhaust path of internal combustion engines or in any reactive system where a durable high surface area catalyst may be required.

SUMMARY OF THE INVENTION

The object of this invention is to provide an active catalyst that is dispersed on and/or throughout high surface area agglomerate bodies to produce catalyst-agglomerate bodies which are integral to a structure. To provide such an integral relationship, it is further contemplated within the scope of this invention to admix the catalyst-agglomerate bodies to the batch material in a manner so that, while the bodies are integrated into the resultant structure, the bodies are not required to chemically interact with the structural material.

It is further provided for the practice of this invention to form catalyst-agglomerate bodies, wherein the agglomerate consists of high surface area powder oxides and/or precursors and a binder (preferably organic).

Once produced, the organically treated, high surface area catalyst-agglomerate bodies are mixed with the structural batch materials to effect a homogeneous structural body. Next, the structural body is extruded through an appropriate die configuration to form a structure. The structure is dried and then sintered such that the intermixed organic binder burns out, leaving the catalyst-agglomerate bodies in a housing within a porous structure. This results in a structure with a readily accessible active catalyst that is integral to the structure but not necessarily bound to the structural matrix.

Additionally, it is provided that high surface area catalyst-agglomerate bodies can be contained within the structure of a porous sintered metal powder.

It is further contemplated to provide a method for producing a structure consisting essentially of a single and/or plurality of catalysts dispersed on and/or throughout high surface area agglomerate bodies comprising the steps of: (a) mixing said high surface area agglomerate bodies with batch material to form a structural body, and (b) firing said structural body to a hardened structure. To effect the method, the catalyst as agglomerated bodies is added to the batch material prior to extrusion.

A method of catalysis is contemplated whereby said structure is placed in the exhaust path of organically fueled power plants and in the exhaust path of internal combustion engines.

Finally, this invention provides an active catalyst within the walls of a structure wherein the catalyst is mixed with high surface area material, then coated with an organic binder. The binder is subsequently burned out during sintering, leaving catalyst-agglomerate bodies which may or may not chemically interact with the structure. The catalyst-agglomerate body is physically encapsulated in a housing which is porous and slightly larger than the encased catalyst-agglomerate body as a result of binder burnout. The catalyst-agglomerate bodies may be buried in the wall of the structure and/or may protrude out of the wall.

DETAILED DESCRIPTION

The product of this invention is a plurality of active catalyst-agglomerate bodies which are encapsulated in a porous structure. The catalysts are preferably precious metals in their elemental or oxide form, or as any of the chemical precursors chosen from the group consisting essentially of rhodium, rhenium, ruthenium, iridium, palladium, platinum, gold, silver, and/or combinations thereof. An Example, intended only as an illustration, of a contemplated combination of the above catalysts is a palladium-rhenium mixture. The precious metals may be added as single and/or multiple species.

Additionally operable within the scope of this invention are the base metals, their oxides, and/or their chemical precursors, chosen from the group vanadium, copper, cobalt, manganese, zinc, nickel, chromium, molybdenum, niobium, tantalum, tungsten, iron, titanium, zirconium, and/or combinations thereof. Additionally contemplated are single and/or multiple species. An example of a multiple species is an iron-vanadium combination which is included here only for purposes of illustration.

Zeolites and alumina can be cast in the role of catalysts in the advantageous use of the present invention. Zeolites and alumina may be used alone as a catalyst-agglomerate body or may be combined with other agglomerate bodies as herein described.

The catalyst of choice is mixed with a high surface area oxide, so that the catalyst is dispersed on and/or throughout the resultant catalyst-agglomerate body. Examples of high surface area oxides are alumina, zirconia, titania, silica, spinels, rare earth oxides, alkaline earth oxides, and zeolites and/or combinations thereof. The high surface area oxides may be used singly or multiply within the same batch material. The agglomerates range in size distribution from 5 to 200 microns, preferably 5 to 100 microns. The hardened high surface area catalyst-agglomerate bodies are coated with or have been admixed with an organic binder such as methyl cellulose, hexadecanol, melted wax, octadecanol, silicone, epoxy resins, and polymerized furfuryl as described in U.S. Pat. No. 4,657,880 herein incorporated by reference, or some combination thereof. The catalyst-agglomerate bodies are then added to the batch material.

Mixed catalysts may be introduced separately on high surface area oxides to form the mixed catalyst-agglomerate bodies. Such separate introduction to the batch material, provides each catalyst, which may be associated with a different specific high surface area oxide, with a vehicle by which it may be introduced to the structure to tailor the catalyzed structure to the contemplated reactant. The batch material may be any ceramic, glass-ceramic, glass, cermet, metal powder, precursors and/or a combination thereof. The metal powder may be selected from the group consisting of the stainless steel 300 and 400 series or any iron, aluminum, copper, nickel, titanium, calcium, tin, chromium, magnesium metal powder, or alloy of these metals or any combination thereof.

A suitable organic binder is added to the batch to provide porosity and formability characteristics during the processing of the product. Open porosity is most preferable and is controlled by batch formulation and firing cycle. The porosity may be either open or closed porosity resulting in a structure containing up to 60 percent and/or 0 to 20 percent porosity, respectively. The ceramic powders used as batch material range in powder size from 0.5 to 200 microns, preferably 0.5 to 100 microns. The metal powders range from 1 to 200 microns, preferably 0.5 to 100 microns. Care must be taken not to use metal powders of too small a size since they are susceptible to pyrophoricity.

Examples of useful ceramic batch materials are cordierite, mullite, alumina, lithium aluminosilicates, zircon, feldspars, quartz, fused silica, kaolin clay, aluminum titanate, silicates, spinels, and mixtures thereof. The most preferred ceramic is cordierite.

A particularly useful metal powder composition consists essentially, as analyzed, of at least 80% by weight aluminum and iron, and no more than about 1% of an alkaline earth metal selected from the group consisting of magnesium and calcium. A preferred metal powder composition consists essentially, as analyzed in weight percent of about 30-90% iron, 5-50% aluminum, and optionally no more than about 1% magnesium and/or calcium as a sintering aid, with useful optional additions including up to 10% tin, up to 10% copper, and up to 10% chromium, the total tin, copper, and chromium being less than about 20%. The method and properties of these metal powder structures are more fully disclosed in U.S. patent application Ser. No. 54,845 which is herein incorporated by reference as filed on May 27, 1987 which will issue as U.S. Pat. No. 4,758,272, on July 19, 1988.

Once combined, the catalyst-agglomerate bodies and batch material mixture are homogenized to evenly disperse the bodies throughout the batch material. It is contemplated, however, that catalyst-agglomerate bodies of varying compositions may be preferentially placed within the structure, in an inhomogeneous manner, such that catalysis may be metered to match a varying stream of effluent. The structural body with the mixed catalyst-agglomerate bodies can be formed into appropriate monolithic structures by various forming techniques and can be extruded through an extrusion die to form structures, especially those known in the art as honeycombs. The formed structure is then fired to sintering with temperatures ranging from 800° C. to 1500° C., preferably 800° C. to 1300° C. Sintering may be performed in an inert, oxidizing, and or reducing atmosphere.

As a consequence of firing a honeycomb or other structure, the organic binders oxidize and the batch materials sinter to form a strong structural body. Sintering may also result in an effective catalyst-agglomerate body circumferential size shrinkage. The body forming process and sintering provide an encapsulated spheroidal-like agglomerate, housed in a structure with open and/or closed porosity. The porosity of the honeycomb walls and the smaller encapsulated spheroidal-like catalyst-agglomerate bodies result in the availability of the catalyst to the potential reactant. The organic binder burnout leaves microchannels and passageways in the structure which allow for the passage of fluids to and from the active catalysts.

Generally, a high surface area spinel may be combined with Pt and Rh salts or other catalysts and mixed with dispersants and acrylic binders, and then spray dried. The spray dried combination provides hard and tough catalyst-agglomerate bodies of high surface area spinel and catalyst. These bodies may then be mixed with either a manganese cordierite glass powder or with a stainless steel powder and extruded into honeycombs using methyl cellulose as a binder. By this process the high surface area material with catalyst may be incorporated into the walls of the honeycombs. Binders, such as acrylics, are added to provide enough consistency to the agglomerates so that they do not disintegrate during the extrusion.

The manganese cordierite glass-ceramic is made by melting the oxides into a glass. The glass has the following composition: 18.7 weight percent $MnO_2$, 3.8 weight percent MgO, 31.4 weight percent $Al_2O_3$, and 46.1 weight percent $SiO_2$. The glass is melted at 1650° C. and cast into slabs. The slabs are crushed and ground to −325 mesh (<44$\mu$) size powders. The powders crystallize above 900° C. to low thermal expansion phases that have good thermal shock resistance. The crystallized phases are $\beta$-quartz and cordierite.

The following examples further illustrate the invention but are not intended as limitations.

EXAMPLE 1

In Example 1, 124.6 grams of magnesium nitrate hexahydrate, 364.8 grams of aluminum nitrate nonahydrate, and 62.8 grams of cerium nitrate were dissolved in distilled water. 478.6 grams of spinel powder (uncalcined Reheis spinel powder) was added to the nitrate solution with additional distilled water to form a stirrable suspension. 725 grams of concentrated Ammonium Hydroxide was added to the suspension and additional water to maintain a stirrable suspension. The suspension consists of 80% of the suspended solid in the form of spinel, the remaining 20% is in the form of a gel. It was necessary to add precipitated gel to provide sufficient strength to the agglomerates during the spray drying. The suspension was transferred to nalgene bottles and centrifuged. The supernatant liquid was decanted, saving the solid precipitate. 4.2 grams of chloroplatinic acid, 1.7 grams of rhodium nitrate in the form of a 10% solution, and enough distilled water to form a slurry were added to the solid precipitate. 81.0 grams of Polysar AL 603, an acrylic binder, and 37.0 grams of Dispex GA-40 as a 50% solution, an acrylic copolymer dispersant supplied by Allied Colloid Inc., Suffolk, Va., were added and rolled for 1 hour to form a slurry to be spray dried.

The spray dried bodies owe their consistency to the gel formed from precipitating the magnesium and aluminum salts as a magnesium aluminum hydroxide gel and the acrylic binder. This consistency results in bodies which maintain their shape and integrity when subsequently mixed with the batch material. Spray drying the bodies, using a Bowen Engineering Model BE-1074 spray dryer, was done at a 10 psi and a pump feed flow rate was 140 grams per minute. The outlet temperature was 130° C. The spray dried bodies were collected as both coarse and fine powders. The coarse powders were collected and mixed with the batch material.

40% by weight of the spray dried spinel catalyst-agglomerate bodies which include platinum and rhodium were mixed with 60% by weight manganese cordierite glass powder. The mixture was homogeneously mixed with enough distilled water added to form a dough consistency. The batch was then extruded into 400 cell per square inch honeycomb monoliths with 150$\mu$ wall thickness. The honeycomb monoliths were dried for 4 hours at 100° C.

The dried honeycombs were sintered at 900° C. in 92% nitrogen and 8% hydrogen gas. The sintered honeycombs were tested for catalytic activity at a space velocity of 50,000 changes per hour using the gas with the same composition as in table 1. The sintered sample had a noble metal concentration of 20 grams per cubic foot, as calculated by the mass/volume characteristic of this concentration. The 50% conversion temperatures in degrees centigrade of these samples were: 249° C. for carbon monoxide, 310° C. for hydrocarbons, and 266° C. for NOx.

EXAMPLE 2

In Example 2, the catalyst-agglomerate bodies were prepared in the same manner as Example 1 except that inclusion of the gel was unnecessary. 300 grams of the high surface area spinel, 3 grams of rhodium nitrate, as 50% solution, and 8 grams of chloroplatinic acid were added to the slurry mixture. 60 grams of Dispex GA-40 and 120 grams of Polysar 609 were added to the catalyst slurry. This mixture was spray dried as in Example 1 to form catalyst-agglomerate bodies.

50 grams of the catalyst-agglomerate bodies were mixed with 950 grams of 316 L stainless steel −325 mesh (less than 44$\mu$ diameter powder) powder, mixed to a dough consistency, and extruded into 400 cell per square inch honeycomb monoliths. The wall thicknesses were 150$\mu$. The honeycombs were dried at 100° C. for 4 hours. The dried honeycombs were sintered at 1300° C. for 30 minutes in hydrogen firing gas for 30 minutes. The sintered samples had a catalytic metal concentration of 20 grams per cubic foot. Testing of the efficiency of the catalytic monolith were performed as in Example 1. The conversion data results are: at 50% conversion, temperature in degrees centigrade, 363° C. for carbon monoxide, 406° C. for hydrocarbons, and 425° C. for NOx.

EXAMPLE 3

Example 3 combines 9.6% by weight chloroplatinic acid and 0.891% by weight rhodium nitrate solutions, diluted with enough water to form a paste with two Vista Catapal powders, 70% Catapal B and 16% Catapal D, both by weight. Catapal B and D were available commercially from Vista Chemical Co., Ponca City, Okla. After drying at 100° C. the resultant powder was mixed with 3 % by weight K75 methyl cellulose and 14% by weight silicone resin powders in a Littleford Laboratory Mixer for 3 minutes and then put into a Lancaster Laboratory Mix-Muller. The water-isopropyl alcohol mixture was added and the mass plasticized for 20 minutes. The plasticized mass was then extruded in the form of ⅛" diameter extrudates, dried at 100° C., and reduced to −100 mesh catalyst-agglomerate bodies. The Pt/Rh ratio in these bodies is 10/1.

The structural batch material consists of metal powder. The structure is formed by mixing 72.0% by weight iron and 28% by weight of a 50% Fe and 50% Al alloy (both powders passing a No. 325 United States Sieve). The batch is then mixed with about 3–8% by weight methyl cellulose, 0.5% by weight zinc stearate lubricant, a 0.5–1% by weight oleic acid wetting agent, mixed with 11% by weight of the above catalyst-agglomerate bodies and water. The mixture is then extruded into a cylindrical honeycomb structure having a 1" diameter, a length of 5', and a 400 cell per square inch cross section with a cell wall thickness of about 150 microns. The honeycombs dried as 12" lengths at a temperature below about 300° C. for 12 hours. A charge of Mg metal or MgF2 was placed in molybdenum boats and those boats positioned adjacent to those containing the honeycomb samples. The juxtaposed boats were then fired for about 15–30 minutes in an atmosphere of mildly flowing argon at temperatures between 1150°–1300° C. The sintered structures resulting therefrom exhibited a porosity ranging between 40–50% with pore sizes varying about 1–20 microns.

Performance tests of the as made catalyst-agglomerate bodies, encapsulated in the porous structure were conducted to compare these samples with data obtained from conventionally coated samples. In these bench tests the gas compositions in table 1 were used at a space velocity of 50,000 changes per hour:

TABLE 1

| | |
|---|---|
| CO | 0.65% |
| $CO_2$ | 7.7% |
| $C_3H_6$ | 300 ppm |
| NO | 500 ppm |
| $O_2$ | 0.48% |
| $H_2$ | 0.20% |
| $H_2O$ | 10% |
| $N_2$ | balance |

Table 2 shows the temperatures at which 50% conversions occurred for CO, HC, and NOx for the 200 squares and 400 squares samples. Commercial samples are included in table 2 for comparison purposes.

TABLE 2

| Sample | Loading $g/ft^3$ | Pt/Rh | Cells per $in^2$ | Wall in | 50% Conversion T° C. CO | HC | NOx |
|---|---|---|---|---|---|---|---|
| 6A | 41 | 10/1 | 400 | .006 | 225 | 335 | 265 |
| 6B | 41 | 10/1 | 200 | .015 | 225 | 328 | 255 |
| X | 31 | 10/1 | 400 | .006 | 300 | 334 | 246 |
| Y | 31 | 5/1 | 300 | .012 | 125 | 226 | 145 |
| Z | 17 | 5/1 | 400 | .006 | 189 | 273 | 199 |

Samples 6A and 6B are samples with encapsulated agglomerates in metal honeycomb structures. The samples X, Y, and Z are commercial samples. The inventive samples show comparable results to those accepted commercially. Samples Y and Z contain more rhodium resulting in increased catalyst availability.

The encapsulated catalyst-agglomerate bodies in the honeycomb structures all exhibit catalytic activity after the sintering step. The catalytic activity is proportional to the effective surface area. Typically, the prior art substrates with a catalytic coating exhibit 20–40 $m^2/g$ surface area, initially. After a breaking in period the activity diminishes to 10–20 $m^2/g$. The encapsulated catalyst-agglomerate bodies within the porous structure exhibit a consistent surface area. Initially, the surface area starts at 10–20 $m^2/g$ and maintains this level of surface area after the break in period.

The implication of such a comparison is that the catalyst-agglomerate bodies within the structure are more stable to mechanical and degradation stresses than the washcoat coated substrates. It is speculated that for the activity of the encapsulated catalyst to decline, the structure itself must show appreciable deterioration before the catalyst will be released. The coated substrates exhibit an appreciable decline in catalytic activity during break in, sacrificing 50% of the catalyst during this time period. By encapsulating the catalyst as herein disclosed, a 50% savings in catalyst may be achieved with little indicated loss in the operable catalyst or structure life.

We claim:

1. A hardened porous sintered structure comprising a single and/or a plurality of catalysts dispersed on and throughout a plurality of high surface area agglomerate bodies wherein said bodies are within the wall of the structure and/or protrude out of said wall and said bodies are integral with said structure.

2. A honeycomb structure comprising a single and/or a plurality of catalysts dispersed on and throughout a plurality of high surface area agglomerate bodies wherein said bodies are contained within the walls and/or protrude out of said walls and integral with said structure.

3. The structure of claim 1 wherein said catalysts are selected from the group consisting essentially of the elements, and/or oxides, and/or chemical precursors of iridium, rhodium, rhenium, ruthenium, platinum, palladium, silver, gold and/or some combination thereof.

4. The structure of claim 1 wherein said catalysts are dispersed as a single species and/or multiple species on a high surface area oxide, a precursor of said oxide, or a combination thereof.

5. The structure of claim 1 wherein said catalysts are selected from the group consisting essentially of the elements and/or oxides, and/or chemical precursors of iron, vanadium, copper, cobalt, nickel, chromium, manganese, titanium, zirconium, zinc, molybdenum, tungsten, niobium, tantalum and/or a combination thereof.

6. The structure of claim 1 wherein said catalysts are zeolites and/or alumina.

7. The structure of claim 1 wherein said structure consists of materials selected from the group consisting of silicates, cermets, glass-ceramics, glasses, cordierite, lithium aluminosilicates, mullite, alumina, spinels, zircon, feldspars, quartz, fused silica, kaolin clays, aluminum titanate, and/or a combination thereof.

8. The structure of claim 1 wherein said high surface area agglomerates are selected from the group consisting essentially of alumina, zirconia, spinels, silica, titania, rare earth metal oxides, alkaline earth metal oxides, and zeolites and/or a combination thereof.

9. The structure of claim 1 wherein said structure consists essentially of sintered metal.

10. The structure of claim 9 wherein said structure consists essentially of metal selected from the group consisting of the stainless steel 300 and/or 400 series, iron, aluminum, copper, tin, chromium, magnesium, calcium, and/or a combination thereof.

11. The structure of claim 9 wherein said structure consists essentially of metal selected from the group in weight percent as analyzed, of 5–50% aluminum, 30–90% iron, the sum of aluminum and iron constituting at least 80% of the total composition, 0–10% tin, 0–10% copper, 0–10% chromium, the sum of tin, copper, and chromium being less than 20%, and optionally not more than 1% of an alkaline earth metal as a sintering aid selected from the group consisting of magnesium and calcium.

12. The structure of claim 1 wherein said high surface area agglomerate bodies are encapsulated in a housing whereby said high surface area agglomerate bodies are unbound in said housing.

13. The structure of claim 12 wherein said housing consists essentially of open and/or closed porosity.

14. The structure of claim 1 wherein said high surface area agglomerate bodies consist essentially of a diameter of about 5 to 200 microns.

15. The structure of claim 1 wherein said high surface area agglomerate bodies consist essentially of a diameter of about 5 to 100 microns.

16. The structure of claim 1 wherein said structure consists essentially of open and/or closed porosity.

17. The structure of claim 1 wherein said structure is a monolith.

18. The structure of claim 1 wherein said structure is extrudable.

19. The structure of claim 1 wherein said high surface area agglomerate bodies are homogeneously dispersed on and throughout said structure.

20. The structure of claim 1 wherein said structure is a honeycomb.

21. A method for producing a hard porous sintered structure consisting essentially of a single and/or a plurality of catalysts dispersed on and throughout high surface area agglomerate bodies wherein said bodies are within the wall of the structure and/or protrude out of said wall comprising the steps of:
  (a) mixing said high surface area catalyst-agglomerate bodies with batch materials and organic binder to form a structural body, and
  (b) firing said structural body to a hardened sintered structure.

22. The method of claim 21 wherein said high surface area agglomerate bodies are spray dried.

23. The method of claim 21 wherein said high surface area agglomerate bodies are coated with an organic binder.

24. The method of claim 21 wherein said high surface area agglomerate bodies are homogeneously mixed with said batch material.

* * * * *

UNITED STATES PATENT AND TRADEMARK OFFICE
CERTIFICATE OF CORRECTION

PATENT NO. : 4,888,317
DATED : December 19, 1989
INVENTOR(S) : Thomas P. DeAngelis, Irwin M. Lachman, Raja R. Wusirika It is certified that error appears in the above-identified patent and that said Letters Patent is hereby corrected as shown below:

Column 8, claim 7, line 44 "consists of"
should read "consists essentially of".

Signed and Sealed this

First Day of December, 1992

Attest:

DOUGLAS B. COMER

Attesting Officer

Acting Commissioner of Patents and Trademarks